(12) United States Patent
Garsi et al.

(10) Patent No.: US 12,017,394 B2
(45) Date of Patent: Jun. 25, 2024

(54) MONITORING APPARATUS AND METHOD

(71) Applicant: FAMA ENGINEERING S.R.L., Rozzano (IT)

(72) Inventors: Fausto Garsi, Milan (IT); Mario Garsi, Milan (IT); Roberto Vegliach, Milan (IT)

(73) Assignee: FAMA ENGINEERING S.R.L., Rozzano (IT)

( * ) Notice: Subject to any disclaimer, the term of this patent is extended or adjusted under 35 U.S.C. 154(b) by 324 days.

(21) Appl. No.: 17/283,911

(22) PCT Filed: Sep. 20, 2019

(86) PCT No.: PCT/IB2019/057983
§ 371 (c)(1),
(2) Date: Apr. 8, 2021

(87) PCT Pub. No.: WO2020/074987
PCT Pub. Date: Apr. 16, 2020

(65) Prior Publication Data
US 2021/0379808 A1 Dec. 9, 2021

(30) Foreign Application Priority Data
Oct. 8, 2018 (IT) .......................... 102018000009248

(51) Int. Cl.
B29C 45/76 (2006.01)
B29C 45/77 (2006.01)
(Continued)

(52) U.S. Cl.
CPC ............. *B29C 45/78* (2013.01); *B29C 45/76* (2013.01); *B29C 45/77* (2013.01); *B29C 45/80* (2013.01);
(Continued)

(58) Field of Classification Search
None
See application file for complete search history.

(56) References Cited

U.S. PATENT DOCUMENTS

| 5,440,932 A | 8/1995 | Wareham |
| 2018/0001530 A1* | 1/2018 | Lawless, III .......... B29C 45/768 |
| 2020/0191665 A1* | 6/2020 | Fleissner ............... G01L 1/2287 |

FOREIGN PATENT DOCUMENTS

| JP | H11129297 A | 5/1999 |
| WO | 2017015573 A1 | 1/2017 |
| WO | 2018005025 A1 | 1/2018 |

OTHER PUBLICATIONS

International Search Report dated Jan. 21, 2020 in PCT Application No. PCT/IB2019/057983, 4 pages.
(Continued)

*Primary Examiner* — S. Behrooz Ghorishi
*Assistant Examiner* — Alexander A Wang
(74) *Attorney, Agent, or Firm* — MH2 TECHNOLOGY LAW GROUP LLP

(57) ABSTRACT

A monitoring apparatus for molds includes a control unit connectable to a first and second sensor associable with the mold and configured for emitting respective signals representative of a deformation parameter and temperature parameter of the mold. The control unit, in order to define an alert condition, is configured for: defining a value of a threshold parameter as a function of the temperature of the mold and comparing such value of the deformation parameter with a value of a threshold parameter defined as a function of the temperature of the mold; or normalizing, at a reference temperature, the value of the deformation parameter determined at the temperature of the mold and comparing a value of a threshold parameter, defined at the reference temperature, with the value of the normalized deformation parameter at the same reference temperature. Also forming (Continued)

the object of the present invention is a monitoring method and a data medium.

20 Claims, 4 Drawing Sheets

(51) Int. Cl.
*B29C 45/78* (2006.01)
*B29C 45/80* (2006.01)
*B29C 45/84* (2006.01)

(52) U.S. Cl.
CPC .... *B29C 45/84* (2013.01); *B29C 2945/76006* (2013.01); *B29C 2945/7604* (2013.01); *B29C 2945/76096* (2013.01); *B29C 2945/7611* (2013.01); *B29C 2945/76163* (2013.01); *B29C 2945/76257* (2013.01); *B29C 2945/76481* (2013.01)

(56) References Cited

OTHER PUBLICATIONS

Written Opinion dated Jan. 21, 2020 in PCT Application No. PCT/IB2019/057983, 6 pages.

* cited by examiner

MONITORING APPARATUS AND METHOD

CROSS-REFERENCE TO RELATED APPLICATIONS

This application is a U.S. National Stage application of PCT/IB2019/057983 filed Sep. 20, 2019, pending, which claims priority to Italian Patent Application No. 102018000009248, filed Oct. 8, 2018, the entire disclosures of which are hereby incorporated by reference in their entireties.

FIELD OF THE FINDING

The object of the present invention is a monitoring apparatus and a relative monitoring method employable in the field of molding, for example plastic injection molding.

STATE OF THE ART

A large number of articles made of plastic material are made today by means of a known process of injection molding; during such process, the molten plastic is injected within suitable molds, which form the shape of the object to be attained. As is known, the injection molds are made by a matrix (also termed female of the mold) and a punch (also termed male of the mold; matrix and punch are mounted on suitable presses which move them between a spaced position, during which the molded product is unloaded or picked up, and an approached molding position (closed mold) during which matrix and punch are in contact with each other in order to define the shape of the object to be attained. The molten plastic is injected within the mold in the approached position of matrix and punch; generally, in order to be able to give the correct aspect and structure to the object to be molded, the press injects the plastic into the mold at high pressures. Simultaneously, the press must push the matrix and the punch against each other so as to oppose the thrust of the plastic injected in the mold and prevent matrix and punch from being spaced from each other: the latter, during the injection step, must stably remain in the approached position. The mold is subjected to high stresses given by the injection of the plastic and the strong contrast thrust exerted by the press in order to maintain matrix and punch in contact with each other. The mold must therefore be correctly designed within pre-established operating conditions for the plastic injection pressure and for the press closure. In case of failure of the mold, it is useful—for the protection of the mold manufacturer and client user—to verify the causes of such failure and in substance establish if the causes are to be ascribed to an incorrect design or to an improper use of the mold.

Monitoring systems have therefore been developed that are capable of verifying several mold working conditions.

For example, systems are known for monitoring the injection pressure of the plastic within the mold, as described in the U.S. Pat. No. 5,440,932 A.

Also employed today are so-called blow-counter sensors, connectable to the control unit of the press, configured for counting the number of closures of the mold, i.e. the number of times that matrix and punch are arranged in approached position; such sensor is however not able to provide any indication regarding the molding modes (plastic injection pressure, pressure closing force) nor a precise number of executed molding cycles: the mold can in fact be moved into the approached matrix and punch position without executing the plastic injection step.

Systems are also used for monitoring deformations of the mold through electric strain gauges. In particular, it is known to use a first strain gauge configured for monitoring the deformation of matrix and/or punch and a second strain gauge suitably mounted on the mold in order to sustain a deformation given only by the perceived variation of temperature, so as to compensate for the temperature of the deformation signal actually measured by the first strain gauge. A similar system is described in the international patent application No. WO 2018/005025 A1 aimed for a method of monitoring and controlling a molding process by means of the use of a variation of a strain gauge. In particular, the method provides for the identification of a signal emitted by a strain gauge applied on a surface of a mold (matrix and/or punch) and, by means of said signal, calculating a deformation of the mold, function of a deformation of the strain gauge. The method also provides for the use of a temperature sensor, positionable in proximity to the strain gauge, and configured for monitoring the temperature of the mold: the temperature data is employed for compensating for the temperature of the deformation signal measured by the strain gauge.

Even if the above-introduced monitoring systems, using electric strain gauges, allowing measuring the deformation thereof, the Applicant has detected that the prior art solutions do not lack drawbacks and limitations. In fact, none of the preceding solutions is capable of detecting the actual execution of a molding cycle and in particular of estimating the potential cause of failure of a mold.

OBJECTS OF THE FINDING

The object of the present invention is therefore that of substantially resolving at least one of the drawbacks and/or limitations of the preceding solutions.

A first objective of the present invention is to provide a monitoring apparatus for molds that is capable of effectively detecting, with extreme precision, the deformations of a mold being formed, so as to be able to determine the correct use thereof; in particular, one object of the present invention is to provide a monitoring apparatus for molds that is capable of verifying the actual structural integrity of the mold during and/or following its use. A further objective of the present invention is to provide a monitoring apparatus for molds that is capable of determining the actual molding cycles sustained by the mold so as to be able to quantify the actual use thereof.

Another object of the present invention is to provide a monitoring apparatus capable of storing the detected information regarding the actual and correct use of the mold in a manner such that the same can be used by the user and by the manufacturer of the mold for determining the causes of possible failure or malfunction of the same. A further object of the finding is to provide a monitoring apparatus having a compact structure, such to allow the easy and quick installation of the same on a mold, but which at the same time is inexpensive.

These and still further objects, which will be clearer from the following description, are substantially attained by a monitoring apparatus and relative monitoring method for molds in accordance with that expressed in one or more of the enclosed claims and/or of the following aspects, taken separately or in any one combination with each other or in combination with any one of the enclosed claims and/or in combination with any one of the further aspects or characteristics described hereinbelow.

SUMMARY

In a 1st aspect, a monitoring apparatus (1) for molds (2) is provided, optionally for injection molds, said monitoring apparatus (1) comprising a control unit (50) connectable to:
- a first sensor (10) associable with the mold (2) and configured for emitting a first signal representative of a deformation parameter of said mold (2),
- a second sensor (11) associable with the mold (2) and configured for emitting a second signal representative of a temperature of said mold (2),
- said control unit (50) being configured for executing a control procedure comprising the following steps:
- receiving the first signal from the first sensor (10) representative of a value of the deformation parameter,
- receiving the second signal from the second sensor (11) representative of a temperature value of the mold (2),
- determining at least one alert condition.

In a 2nd aspect in accordance with the preceding aspect the determination of the alert condition comprises:
- defining a value of a threshold parameter as a function of the temperature of the mold (2) and comparing the value of the deformation parameter determined at the temperature of the mold with the value of the threshold parameter defined as a function of the temperature of the mold, or
- normalizing, at a reference temperature ($T_{ref}$), the value of the deformation parameter determined at the temperature of the mold (2) and comparing such value with a value of a threshold parameter defined at the reference temperature ($T_{ref}$).

In a 3rd aspect in accordance with any one of the preceding aspects said control procedure also comprises the following steps:
- calculating, as a function of the first signal received from the first sensor (10), a value of the deformation parameter,
- calculating, as a function of the second signal received from the second sensor (11), a temperature value of the mold (2).

In a 4th aspect in accordance with any one of the preceding aspects the deformation parameter comprises at least one from among:
- a deformation of the mold (2), optionally a deformation of at least one portion (2a) of the mold (2);
- a displacement of the mold (2), optionally a displacement of at least one portion (2a) of the mold (2), optionally in which said displacement comprises at least one from among a linear displacement and an angular displacement;
- a speed of the mold (2), optionally a speed of at least one portion (2a) of the mold (2);
- an acceleration of the mold (2), optionally an acceleration of at least one portion (2a) of the mold (2).

In a 5th aspect in accordance with any one of the preceding aspects the threshold parameter comprises at least one from among:
- a limit deformation of the mold (2), optionally a limit deformation of at least one portion (2a) of the mold (2);
- a limit displacement of the mold (2), optionally a limit displacement of at least one portion (2a) of the mold (2), optionally in which said limit displacement comprises at least one from among a limit linear displacement and a limit angular displacement;
- a limit displacement speed of the mold (2), optionally a limit speed of at least one portion (2a) of the mold (2);
- a limit acceleration of the mold (2), optionally a limit acceleration of at least one portion (2a) of the mold (2).

In a 6th aspect in accordance with any one of the preceding aspects the threshold parameter comprises:
- at least one variable value defined as a function of the temperature of the mold (2), or
- at least one value, optionally fixed, defined at the predetermined reference temperature ($T_{ref}$).

In a 7th aspect in accordance with any one of the preceding aspects said control procedure comprises a step of calculating the normalized deformation parameter by multiplying the signal or a value of the deformation parameter by a coefficient depending on at least one between the temperature of the mold (2) and the reference temperature ($T_{ref}$).

In an 8th aspect in accordance with any one of the preceding aspects the normalized deformation parameter at the reference temperature ($T_{ref}$) comprises at least one from among:
- a deformation of the mold (2) standardized at the reference temperature ($T_{ref}$), optionally a deformation of at least one portion (2a) of the mold (2) standardized at the reference temperature ($T_{ref}$);
- a displacement of the mold (2) standardized at the reference temperature ($T_{ref}$), optionally a displacement of at least one portion (2a) of the mold (2) standardized at the reference temperature ($T_{ref}$), optionally in which said displacement comprises at least one from among a linear displacement and an angular displacement;
- a speed of the mold (2) standardized at the reference temperature ($T_{ref}$), optionally a speed of at least one portion (2a) of the mold (2) standardized at the reference temperature ($T_{ref}$);
- an acceleration of the mold (2) standardized at the reference temperature ($T_{ref}$), optionally an acceleration of a portion (2a) of the mold (2).

In a 9th aspect in accordance with any one of the preceding aspects the apparatus comprises:
- at least one first sensor (10) associable with the mold (2) and configured for emitting the first signal representative of the deformation parameter of said mold (2), optionally of at least one portion (2a) of the mold (2);
- at least one second sensor (11) associable with the mold (2) and configured for emitting the second signal representative of a temperature of said mold (2), optionally of at least one portion (2a) of the mold (2).

In a 10th aspect in accordance with any one of the preceding aspects the first sensor (10) comprises at least one from among:
- a strain gauge, optionally at least one from among an electric strain gauge, an optical fiber strain gauge, a piezoelectric strain gauge, a quartz strain gauge, a ceramic strain gauge or a semiconductor strain gauge,
- a proximity sensor, optionally at least one from among an inductive proximity sensor, a capacitive proximity sensor, radiofrequency proximity sensor, microwave proximity sensor, ultrasound proximity sensor, laser proximity sensor, optical fiber proximity sensor or laser interferometer.

In an 11th aspect in accordance with any one of the preceding aspects the strain gauge of the first sensor (10) is carried directly by a portion (2a) of the mold (2).

In a 12th aspect in accordance with any one of the preceding aspects the proximity sensor of the first sensor (10) is carried by an external structure that is distinct from the mold (2).

In a 13th aspect in accordance with any one of the preceding aspects the second sensor (11) comprises at least one from among: a thermocouple, an electric heating thermometer, an infrared thermometer, a fiber optic sensor, a strain gauge.

In a further aspect in accordance with any one of the preceding claims said control procedure also comprises the steps of:
receiving, from the second sensor (11), the second signal representative of a temperature value of the mold (2),
estimating, by means of the second signal, a temperature of the mold,
determining, at least as a function of the temperature of the mold, a compensation coefficient,
calculating, as a function of the first signal of the first sensor (10) and of the compensation coefficient, the value of the deformation parameter of the mold.

In a further aspect in accordance with any one of the preceding claims in which the step of calculating the value of the deformation parameter of the mold comprises a sub-step of multiplying the first signal of the first sensor (10) or an estimate of the value of the deformation parameter by the compensation coefficient in order to calculate the value of the deformation parameter of the mold.

In a 14th aspect in accordance with any one of the preceding aspects the control unit (50) is connectable to a pressure sensor (12) configured for emitting a signal representative of a pressure inside the mold (2),
said control procedure also comprises the following steps:
receiving, at the input, said signal representative of the pressure,
calculating, as a function of said signal, at least one pressure value.

In a further aspect in accordance with any one of the preceding aspects the control procedure can also comprise a step of receiving at least one value representative of a pressure inside the mold from said pressure sensor (12).

In a 15th aspect in accordance with any one of the preceding aspects the control unit (50) is connectable to a pressure sensor (12), said pressure sensor is configured for calculating at least one value representative of a pressure inside the mold (2),
said control procedure also comprising a step of receiving, by the control unit, said pressure value.

In a 16th aspect in accordance with any one of the preceding aspects the apparatus comprises at least one pressure sensor (12) configured for emitting at least one from among:
a signal representative of a pressure inside the mold (2),
a value representative of a pressure inside the mold (2),
the control unit (50) being connected to the pressure sensor (12), said control procedure also comprises a step of receiving said signal or value representative of the pressure inside the mold (2).

In a 17th aspect in accordance with any one of the preceding aspects said control procedure also comprises a step of defining the threshold parameter as a function of the value representative of the pressure inside the mold (2).

In an 18th aspect in accordance with any one of the preceding aspects the control unit (50) is connectable to a safety sensor (13) configured for emitting a signal representative of an open or closed condition of the mold (2),
said control procedure also comprising the following steps:
receiving, at the input, said signal from the safety sensor (13),
determining, as a function of said signal, an open or closed condition of the mold (2).

In a 19th aspect in accordance with any one of the preceding aspects the control unit (50) is connectable to a safety sensor (13) which is configured for calculating at least one value representative of an open or closed condition of the mold (2) and sending said value to the control unit (50).

In a 20th aspect in accordance with any one of the preceding aspects the apparatus comprises at least one safety sensor (13) configured for emitting at least one from among:
a signal representative of an open or closed condition of the mold (2),
a value representative of an open or closed condition of the mold (2),
the control unit (50) being connected to the safety sensor (13), said control procedure also comprising a step of receiving, by the control unit, said signal or value representative of the open or closed condition of the mold (2).

In a 21st aspect in accordance with any one of the preceding aspects the threshold parameter is a function of an elasticity parameter representative of a mechanical characteristic of the mold (2), optionally of a portion (2a) of the mold (2).

In a 22nd aspect in accordance with any one of the preceding aspects the elasticity parameter comprises at least one from among:
an elastic modulus of at least one material in which the mold is made, in particular the elastic modulus of the material of the portion (2a) of the mold (2);
a geometry of the mold (2), in particular a geometry of the portion (2a) of the mold (2).

In a 23rd aspect in accordance with any one of the preceding aspects the apparatus comprises at least one memory, optionally a digital memory, connected to the control unit (50), said memory being configured for storing at least one from among:
the signal or the values of the threshold parameter,
the signal or the values of the deformation parameter,
the signal or the values representative of the temperature of the mold (2),
the signal or the values of the normalized threshold parameter,
the signal or the values of the normalized deformation parameter,
the value of the reference temperature ($T_{ref}$),
optionally the coefficient depending on the temperature of the mold (2) and of the reference temperature ($T_{ref}$),
optionally the signal or the values of pressure inside the mold (2), optionally the signal representative of the open or closed condition of the mold (2).

In a 24th aspect in accordance with any one of the preceding aspects the apparatus comprises at least one user interface (60) configured for allowing a user subject to view at least one from among:
the signal or the values of the threshold parameter,
the signal or the values of the deformation parameter,
the signal or the values representative of the temperature of the mold (2),
the signal or the values of the normalized threshold parameter,
the signal or the values of the normalized deformation parameter,
the value of the reference temperature ($T_{ref}$),
optionally the coefficient depending on the temperature of the mold (2) and of the reference temperature ($T_{ref}$),
optionally the signal or the values of pressure inside the mold (2),
optionally the signal representative of the open or closed condition of the mold (2).

In a 25th aspect in accordance with any one of the preceding aspects the first and the second sensor (10, 11) are distinct from each other.

In a 26th aspect in accordance with any one of the preceding aspects said control procedure also comprises a step of defining the alert condition at least if the deformation parameter exceeds the threshold parameter for a predetermined time interval.

In a 27th aspect in accordance with the preceding aspect the predetermined time interval depends on the temperature value of the mold (2).

In a 28th aspect in accordance with any one of the preceding aspects said control procedure, optionally at least during the alert condition, provides for implementing at least one from among the following actions:
sending an alarm message to at least one user subject;
recording in the memory at least one from among:
the signal or the values representative of the deformation parameter;
the signal or the values representative of the temperature of the mold;
the signal or the values representative of the pressure inside the mold;
the signal representative of the open or closed condition of the mold.

In a 29th aspect in accordance with any one of the preceding aspects the apparatus comprises at least one signaling device comprising at least one from among:
a light emitter, a sound emitter, a vibrodyne,
said control procedure also comprises the activation, optionally at least in the alert condition, of said signaling device.

In a 30th aspect, a monitoring method is provided for monitoring molds (2), optionally injection molds, by using an apparatus in accordance with any one of the preceding aspects.

In a 31st aspect in accordance with the preceding aspect the method comprises at least the following steps:
detecting, by means of a first sensor (10), a signal representative of a deformation parameter,
detecting, by means of a second sensor (11), a signal representative of a temperature of the mold (2),
determining an alert condition comprising.

In a 32nd aspect in accordance with any one of the preceding aspects of the method, the step of determining the alert condition comprises:
defining a value of a threshold parameter as a function of the temperature of the mold (2) and comparing the value of the deformation parameter determined at the temperature of the mold (2) with the value of the threshold parameter defined as a function of the temperature of the mold (2), or
normalizing, at a reference temperature ($T_{ref}$), the value of the deformation parameter determined at the temperature of the mold (2) and comparing a value of the normalized threshold parameter at the reference temperature ($T_{ref}$) with a value of the deformation parameter defined at the same reference temperature ($T_{ref}$).

In a 33rd aspect in accordance with any one of the preceding aspects of the method, the method comprises the following steps:
calculating, as a function of the first signal received from the first sensor (10), a value of the deformation parameter,
calculating, as a function of the second signal received from the second sensor (11), a temperature value of the mold (2).

In a 34th aspect in accordance with any one of the preceding aspects of the method, the step of normalizing, at a reference temperature ($T_{ref}$), the value of the deformation parameter comprises a sub-step of multiplying the signal or a value of the deformation parameter by a coefficient depending on at least one between the temperature of the mold (2) and the reference temperature ($T_{ref}$).

In a 35th aspect in accordance with any one of the preceding aspects of the method, the method comprises a step of detecting, by means of a pressure sensor (12), a signal or a value representative of a pressure inside the mold,
the step of defining the threshold parameter is a function of the signal or of the value representative of the pressure inside the mold (2).

In a 36th aspect in accordance with any one of the preceding aspects of the method, the method comprises a step of detecting, by means of a safety sensor (13), an open or closed condition of the mold (2),
in which the step of determining the deformation parameter is executed during the determination of the closed condition of the mold (2).

In a 37th aspect in accordance with any one of the preceding aspects of the method, in which, at least during the alert condition, the method provides for at least one of the following steps:
varying the pressure inside the mold (2);
varying the injection speed of the mold (2);
varying the temperature of the mold (2);
sending an alarm message to at least one user subject;
actuating a signaling device comprising at least one from among a light emitter, a sound emitter, a vibrodyne;
storing at least one from among:
the signal or the values representative of the deformation parameter;
the signal or the values representative of the temperature of the mold (2);
optionally the signal or the values representative of the pressure inside the mold (2);

optionally the signal representative of the open or closed condition of the mold (2).

In a 38th aspect in accordance with any one of the preceding aspects of the method, the method is executed by using an apparatus in accordance with any one of the aspects from the 1st to the 29th.

In a 39th aspect, a use of the apparatus in accordance with any one of the aspects from the 1st to the 29th is provided for detecting deformations on molds, for example injection molds for plastic materials, metal plate molds, casting molds, die casting molds.

In a 40th aspect a data medium is provided comprising instructions configured in a manner such that, when executed by the control unit of the monitoring apparatus (1) for molds (2) according to any one of the aspects from the 1st to the 29th, configure such control unit to execute said control procedure.

In a 41st aspect in accordance with the preceding aspect such medium is one of the following:
an optical data medium storing said instructions,
a magnetic data medium storing said instructions,
an electronic memory storing said instructions, optionally a memory of RAM or ROM or EPROM type,
an electromagnetic carrier storing said instructions.

In a 42nd aspect in accordance with the 40th or 41st aspect said instructions comprise a software program executable by at least one digital microprocessor of said control unit and configuring such microprocessor to execute the control procedure.

BRIEF DESCRIPTION OF THE DRAWINGS

Several embodiments and several aspects of the finding will be described hereinbelow with reference to the enclosed drawings, provided only as a non-limiting example in which.

DEFINITIONS AND CONVENTIONS

It is observed that in the present detailed description, corresponding parts illustrated in the various figures are indicated with the same reference numbers. The figures could illustrate the object of the invention by means of representations that are not in scale; therefore, parts and components illustrated in the figures relative to the object of the invention might only regard schematic representations.

The below-reported steps of the control procedure are executed by means of a control unit 50. In particular, the apparatus described and claimed herein comprises at least one control unit set to control operating conditions established by the same apparatus and/or to control the steps of the process.

The control unit can be a single unit or it can be formed by a plurality of separate control units depending on the design selections and on the operating requirements. With the term control unit, a component of electronic type is intended which can comprise at least one of the following: a digital processor (CPU), a circuit of analogue type, or a combination of one or more digital processes with one or more circuits of analogue type. The control unit can be "configured" or "programmed" for executing several steps: this can be made in practice by any means which allow configuring or programming the control unit. For example, in case of a control unit comprising one or more CPUs and one or more memories, one or more programs can be stored in suitable memory banks connected to the CPU or to the CPUs; the program or programs contain instructions which, when executed by the CPU or by the CPUs, program or configure the control unit to execute the operations described in relation to the control unit. Alternatively, if the control unit is or comprises circuitry of analogue type, then the circuit of the control unit can be designed to include circuitry configured, in use, for processing electrical signals in a manner such to execute the steps relative to the control unit.

DETAILED DESCRIPTION

Monitoring Apparatus 1

Figure 1:
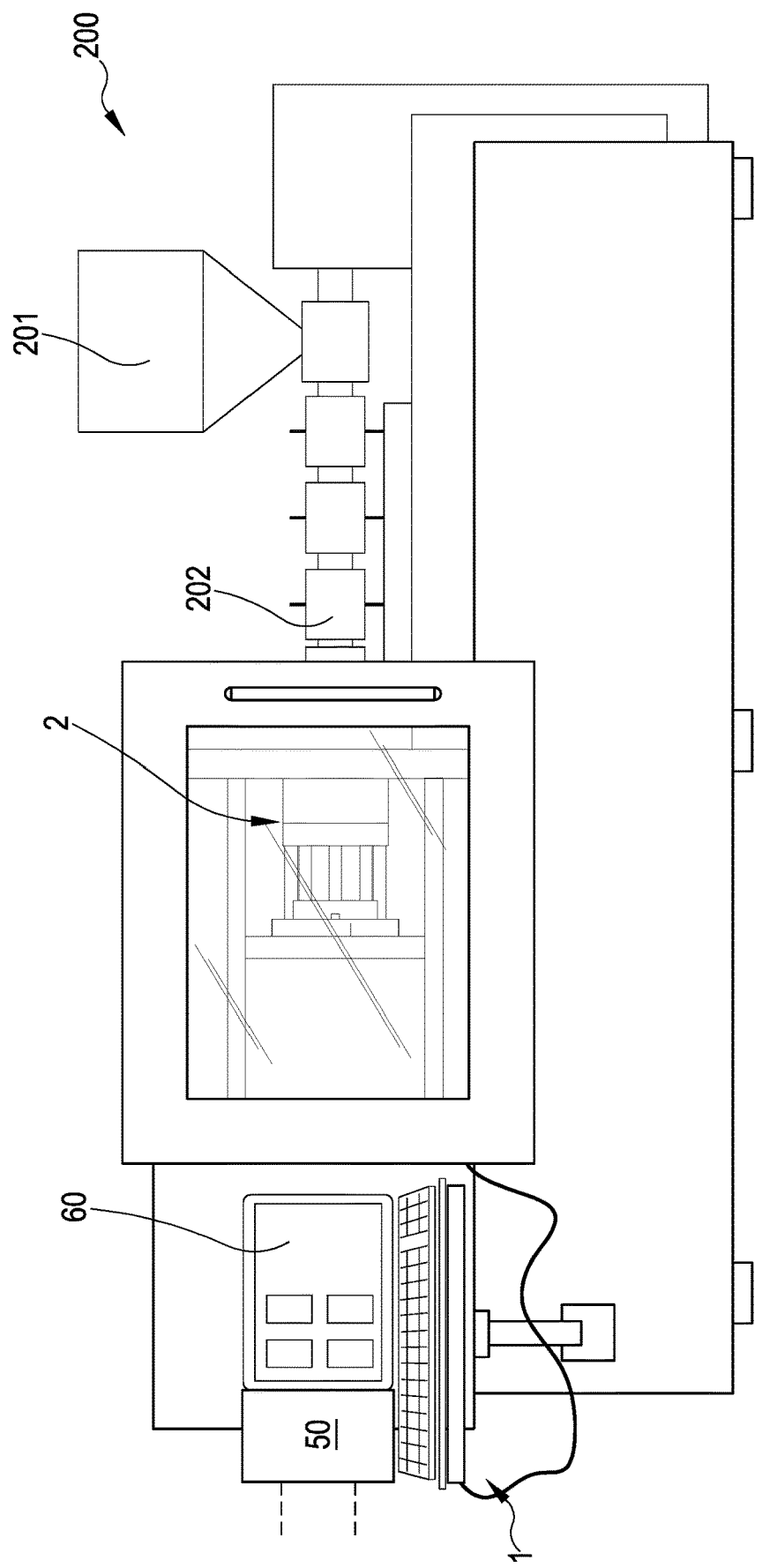
FIG. 1 is a schematic view of a press for plastic injection molding using the monitoring apparatus in accordance with the present invention.

Reference number 1 overall indicates a monitoring apparatus for molds 2, for example for injection molds, of the type shown in FIG. 1. FIG. 1 schematically shows a molding press 200 on which a mold 2 is mounted.

The mold 2 generally comprises at least one matrix and a punch intended to be coupled and defining an interspace G (in technical jargon also defined figure or shape) useful for forming, following the injection of the raw material M (e.g. plastic), at least one product. Matrix and punch, when assembled on the press 200, are movable with respect to each other between an open condition in which matrix and punch are spaced from each other (FIG. 3) and a closed condition (FIG. 4) in which matrix and punch are close to each other to define the interspace G for forming the product. In case of injection molds, the closed condition represents the (approached) condition of matrix and punch during which the molten material (e.g. plastic) is injected in the mold (in the figure defined between matrix and punch). During such closed condition and specifically during the formation of the product, the mold 2 sustains strong stresses due to the press closure force (compression of matrix and punch against each other) and due to the pressure with which the material is thrust, optionally injected, in the figure. The monitoring apparatus 1 is then configured for detecting and evaluating the stresses to which the mold 2 is subjected, determining an alert condition if deemed opportune.

Hereinbelow, the embodiments of the monitoring apparatus 1 in accordance with the present invention are described.

1.1 First Embodiment of the Monitoring Apparatus 1

Figure 2:
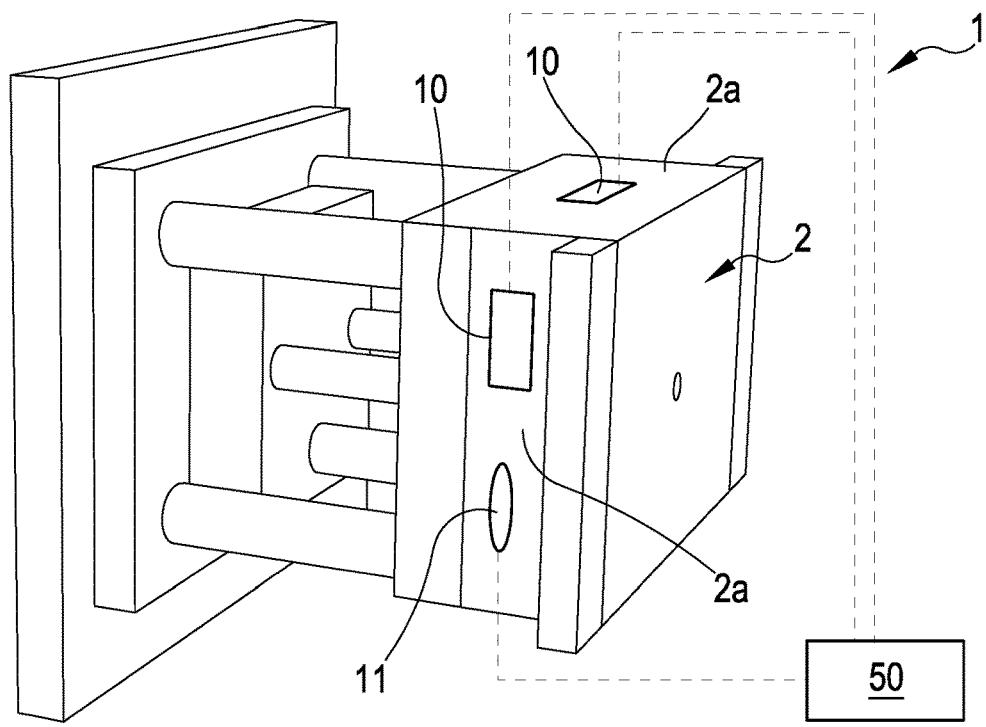
FIGS. 2-5 are schematic views of a monitoring apparatus in accordance with the present invention associated, in a non-limiting manner, with an injection mold.

A first embodiment the monitoring apparatus 1 comprises a first sensor 10 (see FIG. 2) associable with the mold 2 and configured for detecting, at least during a use condition of the mold 2 (at least during the closed and molding condition), a first signal representative of a deformation parameter of the mold 2. In more detail, the deformation parameter can comprise a deformation of the mold 2 or of at least one portion 2a of the mold 2, a linear or angular displacement of the mold 2 or of at least one portion 2a of the mold 2, a speed of the mold 2 or of at least one portion 2a of the mold 2, an acceleration of the mold 2 or of at least one portion 2a of the mold 2. In other words, the deformation parameter allows detecting a magnitude representative of a mechanical stress or deformation to which the mold 2, or at least one portion 2a thereof, is subjected during the processing cycle, due to the high pressures of mold closure and material injection that are commonly used.

Figure 3:
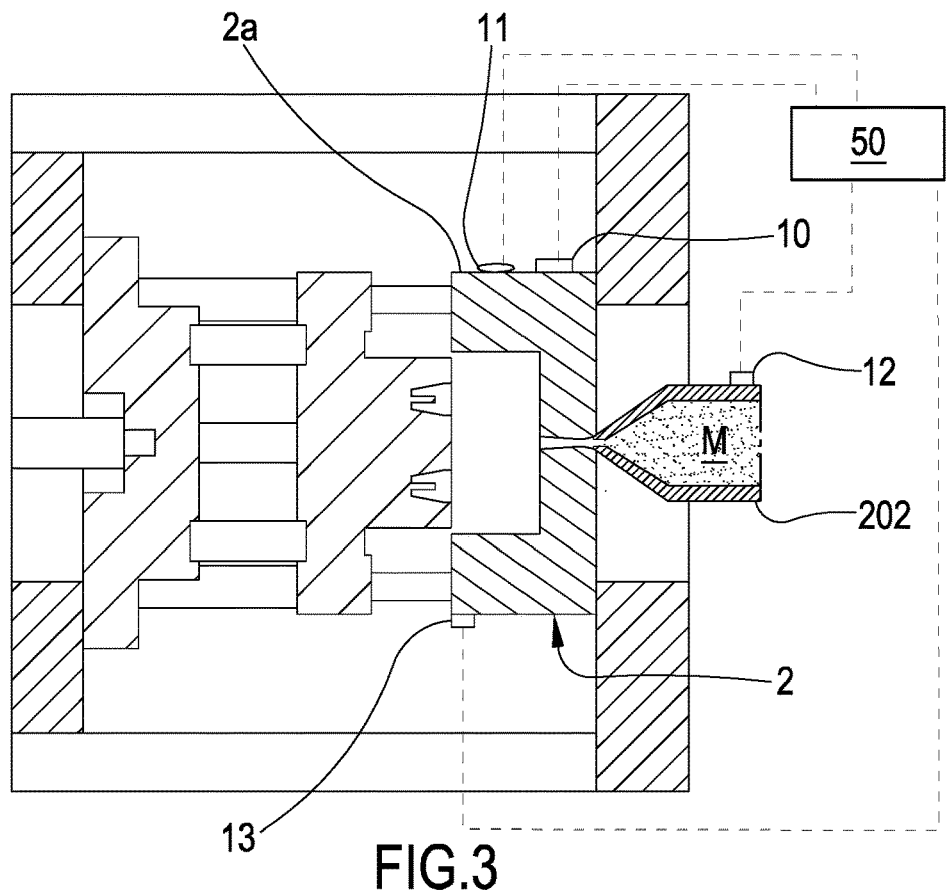
Figure 4:
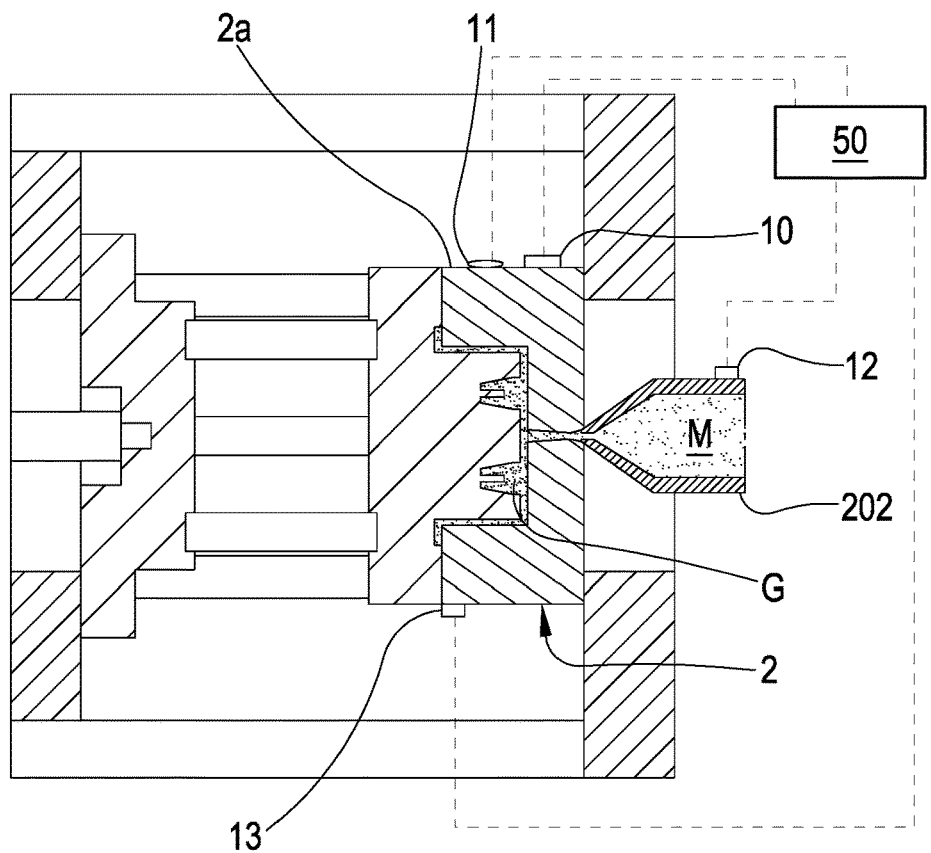
Figure 5:
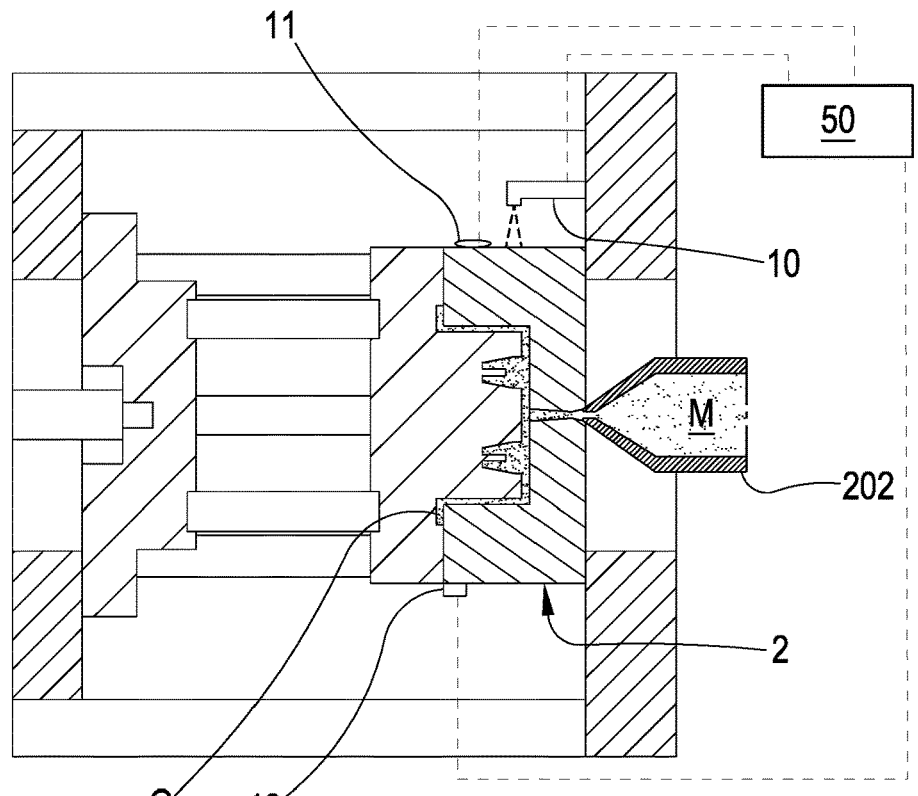

The first sensor 10 can comprise a strain gauge (as schematically shown in FIGS. 3 and 4) of electric type, an optical fiber strain gauge, piezoelectric strain gauge, quartz strain gauge, ceramic strain gauge or semiconductor strain gauge. Furthermore, the first sensor 10 can comprise a proximity sensor (as schematically shown in FIG. 5) of inductive type, or a capacitive proximity sensor, radiofrequency proximity sensor, microwave proximity sensor, ultrasound proximity sensor, laser proximity sensor, optical proximity sensor, optical fiber proximity sensor or comprising a laser interferometer. Optionally, the monitoring apparatus 1 can comprise one or more of the above-listed sensors, used separately or in a combination thereof. If the first sensor 10 is a strain gauge, the latter is borne, optionally firmly engaged, directly on a portion 2a of the mold 2. The application of the strain gauge is generally carried out by gluing the latter on the portion of the mold 2 that one wishes to monitor, for example at the portion of the mold 2 in which the deformation is greater. In the case instead in which the first sensor 10 is a proximity sensor, the latter is generally carried by an external structure separate from the mold 2, e.g. fixed like a press surface (FIG. 5). The first sensor 10 can be of smart type, configured for directly emitting a value of the deformation parameter: in other words, the smart sensor itself has a control unit configured for processing the signal generated by the same sensor and directly emitting the deformation value. The apparatus 1 also comprises a second sensor 11, also associable with the mold 2, and configured for emitting, at least during a use condition of the mold 2, a second signal representative of a temperature of the mold 2. In more detail, the signal representative of temperature can be an electric heating value, an electric voltage value, an electric current value, an optical value or a combination thereof. The second sensor 11 can then be a thermocouple, an electric heating thermometer, an infrared thermometer, a fiber optic sensor, a strain gauge. As is known, an estimate of the temperature can be obtained in a multitude of different modes: the most well-known measurement instruments were therefore listed only as an example, without precluding the possibility of using different sensors. Optionally, the second sensor 11 comprises a smart sensor configured for directly emitting at least one temperature value. In other words, the smart sensor itself has a control unit configured for processing the signal that can be generated by the same sensor and directly emitting the temperature value. The first and the second sensor 10, 11 are distinct from each other; nevertheless, it is also possible to combine the first and the second sensor 10, 11 to form a single body.

The monitoring apparatus 1 comprises a control unit 50 placed in connection with the first sensor 10 and configured for executing a control procedure comprising at least one step of receiving the first signal representative of a deformation parameter from the first sensor 10. The control procedure also comprises a step of calculating, as a function of said first signal, a value of the deformation parameter. The control unit 50 is also placed in connection with the second sensor 11; said control procedure also comprises a step of receiving the second signal representative of the temperature of the mold 2. The control procedure also comprises a step of calculating, as a function of the second signal, a temperature value.

Figure 6:
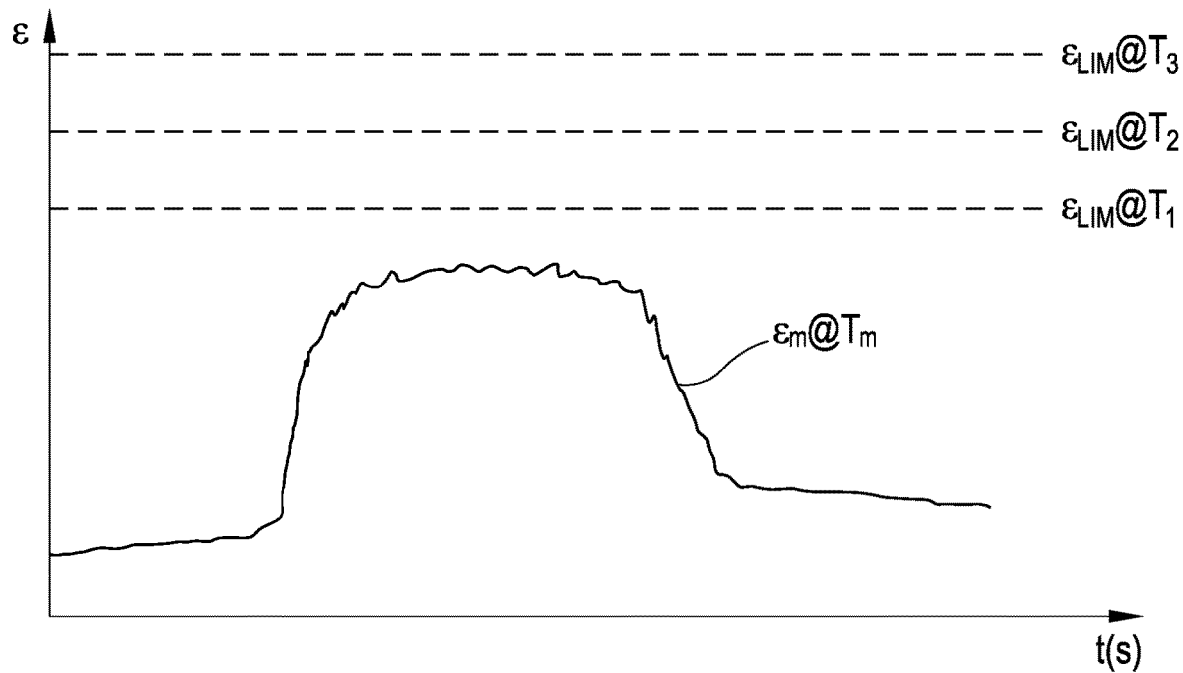
FIGS. 6 and 7 are respective graphs that show the progression of the deformation during a molding cycle, in relation to a limit deformation that is a function of the mold temperature.

The control procedure also comprises a further step of defining (by the control unit 50) an alert condition, based on the outcome of a comparison between the deformation parameter detected by means of the first sensor 10, and a threshold parameter; said control procedure can also provide, for the definition of the alert condition, the definition of a value of a threshold parameter as a function of the temperature of the mold 2 and compare the deformation parameter, determined at a measured temperature $T_m$ of the mold 2, with a respective value of the threshold parameter correlated at said temperature $T_m$ (see FIG. 6). Such threshold parameter (defined by the control unit 50 during the control procedure) comprises at least one from among a limit deformation of the mold 2 or of at least one portion 2a of the mold 2, a limit linear displacement or limit angular displacement of the mold 2 or of at least one portion 2a of the mold 2, a limit displacement speed of the mold 2 or of at least one portion 2a of the mold 2, a limit acceleration of the mold 2 or of at least one portion 2a of the mold 2.

In other words, said control procedure also comprises the following steps:
  determining a profile of the deformation parameter $\varepsilon_m$ detected at a temperature $T_m$ of the mold 2 (indicated in FIG. 6 as $\varepsilon_{m@}T_m$);
  determining a threshold parameter that can vary as a function of the temperature detected at the mold 2 (indicated in FIG. 6 as $\varepsilon_{lim@}T_{1,2,3}$);
  comparing the deformation parameter $\varepsilon_{m@}T_m$ with the respective threshold parameter $\varepsilon_{lim@}T_{1,2,3}$.

FIG. 6 shows the deformation parameter $\varepsilon_m$ of the mold 2, detected by means of the first sensor 10, as a function of the time during a use condition of the mold 2 and in which the deformation parameter itself is detected at a temperature $T_m$: the profile of the deformation parameter $\varepsilon_m$ is traced merely as a non-limiting example. Alternatively, said control procedure, during the definition of the alert condition, can comprise a step of normalizing, at a reference temperature $T_{ref}$, the value of the deformation parameter detected at a measured temperature $T_m$ of the mold 2, and comparing the value of the threshold parameter, defined at the same reference temperature $T_{ref}$, with the value of the normalized deformation parameter (see FIG. 7). In other words, said control procedure can also comprise the following steps:
  determining a profile of the deformation parameter $\varepsilon_m$ detected at a temperature $T_m$ of the mold 2 ($\varepsilon_{m@}T_m$) and normalizing it at a reference temperature $T_{ref}$ (the normalized deformation profile is indicated in FIG. 7 as $\varepsilon_{m@}T_{ref}$);
  determining a threshold parameter at the reference temperature $T_{ref}$ (the profile of the threshold parameter is indicated in FIG. 7 as $\varepsilon_{lim@}T_{ref}$);
  comparing the normalized deformation parameter $\varepsilon_{m@}T_{ref}$ with the threshold parameter $\varepsilon_{@}T_{ref}$.

In other words, the deformation parameter $\varepsilon_m$, detected at the measured temperature $T_m$ of the mold 2, is then normalized at a reference temperature $T_{ref}$ to define a normalized deformation parameter. The normalization step allows obtaining the value of the deformation parameter $\varepsilon_m$ which the first sensor 10 would detect if the mold 2 is situated at a temperature equal to the reference temperature $T_{ref}$. In this case, the normalized threshold parameter $\varepsilon_{lim@}T_{ref}$ does not depend on the temperature of the mold 2, but it has a predetermined profile associated with said reference temperature $T_{ref}$.

FIG. 6 shows the normalized deformation parameter at the reference temperature $T_{ref}$ and as a function of the time during a use condition of the mold 2: the profile of the normalized deformation parameter $\varepsilon_{m@}T_m$ is traced merely as a non-limiting example. For example, the normalized deformation parameter $\varepsilon_{m@}T_{ref}$ is obtained by multiplying the signal or the value of the deformation parameter $\varepsilon_{m@}T_m$, obtained by the first sensor 10 and detected at a temperature $T_m$ of the mold 2, by a coefficient depending on the temperature $T_m$ of the mold 2 and of the reference temperature $T_{ref}$.

Figure 7:
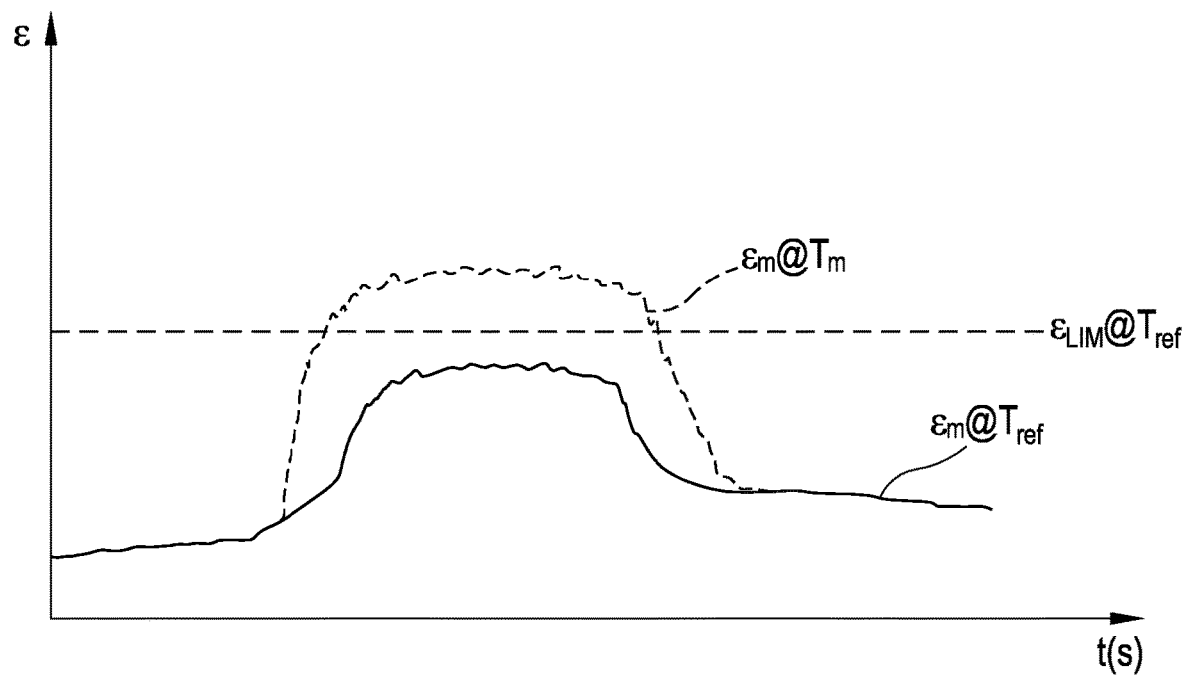

In FIGS. 6 and 7, the threshold parameter variable with the temperature and the normalized threshold parameter were depicted as constants over time, ideally corresponding to a straight line fixed at a predetermined value as a function of the time: alternatively, the profile of the threshold parameter can have a different shape, upon discretion of the judgement of the man skilled in the art. The threshold parameter can comprise: at least one value that can vary as a function of the temperature $T_m$ of the mold 2, or at least one value normalized at the reference temperature $T_{ref}$.

The monitoring apparatus 1 then allows considering, optionally compensating for, the influence that a temperature variation determines on the mechanical characteristics of the mold. It is in fact known that, at least in the case of metal materials, the elastic modulus (or Young's Modulus) depends on the temperature of the material: in particular it is known that the value of the elasticity modulus decreases, according to a representative profile of the material, with the increase of the temperature. It follows that, given the same pressure inside the mold 2 and hence given the same intensity of the force, the deformations associated with the mold 2 can vary as a function of the temperature of the mold 2 itself. Furthermore, the maximum load supported by a material (specifically the maximum stress attainable by the material) also depends, at least in the case of several metal materials, on the temperature: the monitoring apparatus 1 thus allows considering the variation of the mechanical characteristics of the mold 2, such as the elastic modulus and strength, as a function of the temperature of the mold 2 itself.

The definition of the alert condition also depends on the outcome of the comparison between threshold parameter and deformation parameter: the alert condition can then be defined if the deformation parameter exceeds, for example for a predetermined time interval, the respective threshold parameter. Said predetermined time interval can furthermore depend on the temperature value of the mold 2. During the alert condition and as a function the signals emitted by the first and by the second sensor, the control procedure can provide for a variation of at least one operating parameter for the mold, including the injection pressure of the molten material within the mold 2, the injection temperature, the flow rate of material to be injected within the mold 2, the injection speed of said material or the temperature of the mold, so as to prevent damaging the mold itself or generally in order to optimize the operating parameters. In detail, the control procedure (executed by the control unit 50) can provide for a variation of said operating parameters of the mold 2. Furthermore, the control procedure, during the alert condition, can provide for a step of sending an alarm message to at least one user subject. The apparatus 1 can comprise a signaling device, including a light emitter, a sound emitter or a vibrodyne; the control procedure can comprise a step of actuating said signaling device during the alert condition.

The monitoring apparatus 1 can also comprise a pressure sensor 12 configured for emitting a signal representative of a pressure inside the mold 2. The sensor can be positioned directly on the mold 2 or at an inlet portion for the material to be injected within the mold 2. In general, the pressure sensor aims to estimate a magnitude identifying the force acting on the mold. Said control procedure can also provide for the following steps of receiving the signal representative of the pressure and calculating, as a function of said signal, at least one pressure value. The pressure sensor 12 can comprise a pressure sensor of smart type configured for emitting at least one pressure value: in this case, the control procedure provides for a step of directly receiving the pressure value. In other words, the pressure sensor of smart type itself has a control unit thereof configured for processing the signal that can be generated by the same and directly emitting the pressure value. The control procedure can provide for defining the threshold parameter, normalized or variable with the temperature of the mold, as a function of the value representative of the pressure inside the mold 2. The threshold parameter, in addition to being dependent on the temperature or normalized at a reference temperature $T_{ref}$, can also furthermore depend on the detected pressure value.

Furthermore, the monitoring apparatus 1 can comprise a safety sensor 13 configured for emitting a signal representative of an open or closed condition of the mold 2. The control procedure can also comprise the steps of receiving, in input, the signal representative of an open or closed condition and determining, as a function of said signal, a value representative of the open or closed condition of the mold 2. The monitoring apparatus 1, by means of the safety sensor, therefore allows verifying the opening and closing of the mold, as well as detecting the number of closures and openings of the same so as to define a record of the work cycles.

The monitoring apparatus 1 can also provide for a setting operating condition, in which the first sensor 10 is configured for emitting, during at least one use cycle of the mold 2, a first reference signal representative of the deformation parameter of the mold 2. Analogously, the second sensor 11 is configured for emitting, during the same use cycle of the mold 2, a second reference signal representative of the temperature of the mold 2. The control procedure can also comprise the steps of receiving the first and the second reference signal, and determining, based on the first and on the second reference signal, at least one reference value representative of the deformation parameter and at least one reference value representative of the temperature of the mold 2. The detected reference signal of the deformation parameter thus defines, in combination with the respective reference signal of the temperature, a signal representative of the threshold parameter. In other words, the signal or the values of the threshold parameter can be determined by means of experimental tests, in particular by varying one or more operating parameters of the mold itself, such as the temperature of the mold or the injection pressure.

It is useful to observe that the control unit 50—before it executes the comparison between the value of the threshold parameter, function of the temperature, with the deformation parameter value (at the temperature of the mold 2) or before executing the normalization (at the reference temperature $T_{ref}$) of the deformation parameter determined at the temperature of the mold 2—can execute a temperature compensation of the deformation signal estimated by the first sensor 10. In particular, the control unit 50 is configured for receiving the first signal from the first sensor 10 and estimating a deformation of the mold; the control unit 50 can also receive from the second sensor 11 the second signal representative of a temperature value of the mold 2 and estimating, due to this signal, the temperature of the mold. Then, the control unit can determine, at least as a function of the temperature of the mold, a compensation coefficient usable for compensating for the estimation of the deformation of the mold for the calculation of the (actual) deformation of the mold which accounts for the deformations of the first sensor itself. In fact, the control unit 50 is configured for calculating, as a function of the first signal of the first sensor 10 and of the compensation coefficient, the value of the deformation parameter of the mold; such step comprises a sub-step for multiplying the first signal of the first sensor 10 or an estimate of the value of the deformation parameter by the compensation coefficient in order to calculate the value of the deformation parameter of the mold. Only after the temperature compensation of the deformation parameter of the mold, this is:

compared with the value of the threshold parameter defined as a function of the temperature of the mold, normalized, at a reference temperature $T_{ref}$, and compared with the value of the threshold parameter defined at the reference temperature $T_{ref}$.

In other words, the determined value relative to the temperature of the mold can initially be employed for calculating the actual deformation of the mold (due to a temperature compensation of the signal or value determined by means of the first sensor) and then is used for compensating for the effects that a variation of the temperature causes on the mechanical characteristics of the mold structure, obtaining an accurate estimation of the actual stresses of the mold.

The apparatus 1 can also comprise a memory, e.g. of digital type, placed in connection with the control unit 50 and configured for recording at least one from among the signal or the values of the threshold parameter, the signal or the values of the deformation parameter detected by means of the first sensor 10, the signal or the values representative of the temperature of the mold 2 detected by means of the second sensor 11, the signal or the values of the normalized threshold parameter, the signal or the values of the normalized deformation parameter, the value of the reference temperature $T_{ref}$, the signal or the values of pressure inside the mold 2 detected by means of the pressure sensor 12 and the signal representative of the open or closed condition of the mold 2 detected by means of the safety sensor 13. Said above-listed signals and values can therefore be stored in a memory and define a record of the mold operating parameters, so as to subsequently define if the set threshold values were respected or not in the use of the mold.

The apparatus can also comprise a graphic interface 60 (FIG. 1), placed in connection with the control unit 50 and configured for allowing the user to view the threshold parameter, the deformation parameter, the temperature of the mold 2, the normalized threshold parameter, the normalized deformation parameter, of the reference temperature $T_{ref}$, the pressure inside the mold 2 and the open or closed condition of the mold 2. For example, the graphic interface 60 can be a display, a tablet or a smartphone.

1.2 Second Embodiment of the Monitoring Apparatus 1

The monitoring apparatus 1, in accordance with the second embodiment, is configured for implementing the same operations described above in accordance with the first embodiment, with the difference that the monitoring apparatus 1 does not comprise at least one from among the first and the second sensor 10, 11. In fact, in the second embodiment, the apparatus only comprises the control unit 50 as described above, adapted to execute said control procedure; the signals or values entering the control unit are received by sensors (for example by the first and second sensor 10, 11) which are not part of the apparatus 1 in accordance with the second embodiment. In detail, the control unit 50 is connectable to:

a first sensor configured for emitting a first signal representative of a deformation parameter of the mold 2, and a second sensor configured for emitting a second signal representative of the temperature of the mold 2.

The control procedure comprises the steps of receiving (at the input of the control unit) the first signal and calculating, as a function of said signal, at least one value representative of the deformation parameter.

The control unit 50 is also connectable to a pressure sensor 12 (not part of the apparatus 1 in accordance with the second embodiment) configured for emitting a signal representative of a pressure inside the mold 2. Said control procedure can then comprise the steps of receiving (at the input of the control unit) the signal representative of the pressure and calculating, as a function of said signal, at least one pressure value. Optionally, the control unit 50 is connectable to a smart pressure sensor 12 of the type as described in the preceding section: the control procedure in this case provides for the reception of said value representative of the pressure inside the mold.

The control unit 50 is also connectable to a safety sensor 13 (not part of the apparatus 1 in accordance with the second embodiment), the latter configured for emitting a signal representative of an open or closed condition of the mold 2. Said control procedure can then comprise the steps of receiving said signal at the input and calculating, as a function of said signal, at least one value representative of the closed condition or open condition of the mold 2. Optionally, the control unit 50 is connectable to a smart safety sensor 13 of the type as described in the preceding section: the control unit 50 is then configured for receiving said value representative of the closed or open condition of the mold 2.

Analogous to that set forth above in accordance with the first embodiment of the monitoring apparatus 1, the control procedure comprises at least one step of defining the alert condition: for the determination of the alert condition, reference is made to the preceding description relative to the first embodiment of the monitoring apparatus 1.

Monitoring Method

Also forming the object of the present invention is a monitoring method for monitoring molds 2 comprising at least the steps of detecting, by means of a first sensor 10, a signal representative of a deformation parameter, detecting, by means of a second sensor 11, a signal representative of a temperature of the mold 2 and determining an alert condition.

In detail, the deformation parameter comprises at least one from among a deformation of the mold, a linear displacement or angular displacement of the mold 2, a speed of the mold 2 or an acceleration of the mold 2. The deformation parameter can be obtained by multiplying the first signal of the first sensor or directly an estimate of the value of the deformation parameter by a compensation coefficient, function of the temperature detected by the second sensor 11. In this manner, the method can calculate the (actual) value of the deformation parameter of the mold at the temperature of the mold 2, accounting for possible errors, generatable by the first sensor 10, function of the temperature.

The method can also provide for the steps of calculating, as a function of the first signal received from the first sensor 10, a value of the deformation parameter and, as a function of the second signal received from the second sensor 11, a temperature value of the mold 2.

The step of determining the alert condition comprises the sub-steps of defining a value of a threshold parameter as a function of the temperature of the mold 2 and comparing the value of the deformation parameter determined at the temperature of the mold 2 with the value of the threshold parameter defined as a function of the temperature of the mold 2. On the basis of a predetermined comparison law, the step of comparing the deformation parameter with the threshold parameter determines the alert condition. For example, the comparison step can verify if the value of the deformation parameter exceeds or does not exceed the threshold parameter: in other words, if the deformation detected by the first sensor 10 exceeds a limit value of deformation represented by the value of the threshold parameter, the monitoring method provides for the definition of the alert condition.

As an alternative to said sub-steps, the method comprises the steps of normalizing, at a reference temperature $T_{ref}$, the value of the deformation parameter determined at the temperature of the mold 2 and comparing a value of the normalized threshold parameter at the reference temperature $T_{ref}$ with the value of the normalized deformation parameter at the same reference temperature $T_{ref}$.

The step of normalizing, at a reference temperature $T_{ref}$, the value of the deformation parameter can provide for a sub-step of multiplying the signal or a value of the deformation parameter by a coefficient depending on the temperature of the mold 2 and of the reference temperature $T_{ref}$. Furthermore, the detection method comprises the steps of detecting, by means of a pressure sensor 12, a signal representative of a pressure inside the mold, and calculating, as a function of said signal, at least one pressure value.

In an alternative embodiment, the method provides for a step in which a control unit 50 directly receives at least one value representative of a pressure inside the mold 2 from a pressure sensor 12. The method can provide for the determination of the threshold parameter as a function of the value representative of the pressure inside the mold 2. The method also comprises the following steps:
  detecting, by means of a safety sensor 13, a signal representative of an open or closed condition of the mold 2, and
  determining, as a function of said signal, an open or closed condition of the mold 2.

In order to define the threshold parameter, the method can comprise a step of defining a setting operating condition having at least the steps of detecting, by means of the first sensor 10, a first reference signal representative of the deformation parameter of the mold 2, and detecting, by means of the second sensor 11, a second reference signal representative of the temperature of the mold 2. The monitoring method then provides for determining, based on the first and second reference signal, at least one reference value representative of the deformation parameter and at least one reference value representative of the temperature of the mold 2.

The signal or the reference values of the deformation parameter thus obtained define, in combination with the respective signal or reference values of the temperature, a signal or values representative of the threshold parameter.

The method also comprises a step of storing in a memory, for example of digital type, the threshold parameter, the deformation parameter, the temperature of the mold 2, the normalized threshold parameter, the normalized deformation parameter, the reference temperature $T_{ref}$, the pressure inside the mold 2 or the signal representative of the open or closed condition of the mold 2.

The method also comprises a step of displaying, by means of a user interface, at least one from among the threshold parameter, the deformation parameter, the temperature of the mold 2, the normalized threshold parameter, the normalized deformation parameter, the reference temperature $T_{ref}$, the pressure inside the mold 2 or the signal representative of the open or closed condition of the mold 2.

During the alert condition, the method can comprise a step of varying the pressure inside the mold 2, the injection speed of the mold 2 or the temperature of the mold 2, sending an alarm message to at least one user subject or actuating a signaling device including a light emitter, a sound emitter, a vibrodyne. Furthermore, the method can comprise a step of recording in a memory, e.g. a digital memory, the deformation parameter, the temperature of the mold 2, the pressure inside the mold 2 or the signal representative of the open or closed condition of the mold 2.

The above-described monitoring method can be implemented by means of the above-described monitoring apparatus 1.

Data Medium

Also forming the object of the present invention is a data medium comprising instructions configured in a manner such that, when executed by the control unit 50 of the monitoring apparatus 1 in accordance with any one of the enclosed claims and/or in accordance with the above-reported description, configure such control unit 50 to execute said control procedure.

In detail, such medium can comprise at least one of the following devices:
  an optical data medium storing said instructions,
  a magnetic data medium storing said instructions,
  an electronic memory storing said instructions, optionally a memory of RAM or ROM or EPROM type,
  an electromagnetic carrier storing said instructions.

The instructions comprise a software program executable by at least one digital microprocessor of said control unit and configuring such microprocessor to execute the control procedure.

Advantages of the Invention

The present invention attains the proposed objects, overcoming the drawbacks lamented in the prior art. In accordance with that described above, the present apparatus and the relative method allow effectively monitoring the operation of a mold, e.g. of an injection mold. In particular, the present invention allows accurately estimating the actual stresses, such as a deformation parameter, to which mold is subjected with the variation of the use conditions. Furthermore, the present invention can allow performing corrective actions by acting on the operating parameters of the mold.

An important advantage of the present invention lies in the fact that the deformation parameter of the mold, detected by the monitoring apparatus, can be evaluated with greater awareness/intelligence, accounting for the temperature values detected at the mold. It is in fact known that both the elastic modulus (Young's Modulus) and the maximum strength value (e.g. the maximum tensile strength value) of the material constituting the mold is modified with the variation of the temperature: consequently, the threshold beyond which an alert condition is evaluated changes with the variation of the temperature. Hence, the possibility of being able to evaluate with more precision the threshold of maximum deformation (alternatively the maximum threshold of displacement, speed or acceleration of the portion of interest of the mold) allows obtaining a more accurate monitoring of the structure, consequently providing data regarding the operation of the mold.

The measurement systems that are known today use a signal representative of the temperature only for the purpose of compensating for the effects that the latter determines on the measurement system itself. Indeed, it is known that, in the case of use of strain gauges adapted to detect a deformation of a structure, the signal emitted by the strain gauge is affected by the temperature variations. Different expedients are therefore known that are adapted to cut, from said signal, the level part caused by the temperature variations. In this manner, the known systems are capable of determining the actual deformation of the strain gauge but are not at all capable of detecting the deformation that the mold can sustain at a predetermined temperature and hence the actual damage of the mold.

The present invention thus represents an important improvement in the field of mold monitoring, since it allows compensating for the effects that a variation of the temperature causes on the mechanical characteristics of the structure itself (not only on the strain gauges), obtaining a more accurate estimation of the actual stresses, consequently a more intelligent evaluation of the same stresses.

The invention claimed is:

1. Monitoring apparatus for molds, said monitoring apparatus comprising a control unit connectable to:
    a first sensor associable with the mold and configured for emitting a first signal representative of a deformation parameter of said mold,
    a second sensor also associable with the mold and configured for emitting a second signal representative of a temperature of said mold,
    said control unit being configured for executing a control procedure comprising the following steps:
    receiving the first signal from the first sensor representative of a value of the deformation parameter,
    receiving the second signal from the second sensor representative of a temperature value of the mold,
    determining at least one alert condition,
    wherein the determination of the alert condition comprises:
    defining a value of a threshold parameter as a function of the temperature of the mold and comparing a value of the deformation parameter determined at the temperature of the mold with a value of the threshold parameter defined as a function of the temperature of the mold, or
    normalizing, at a reference temperature, the value of the deformation parameter determined at the temperature of the mold and comparing such value with a value of a threshold parameter defined at the reference temperatures
    wherein said control procedure comprises a step of calculating the normalized deformation parameter by multiplying the first signal or the value of the deformation parameter by a coefficient depending on at least one between the temperature of the mold and the reference temperature.

2. The monitoring apparatus according to claim 1, wherein said control procedure also comprises the following steps:
    calculating, as a function of the first signal received from the first sensor, a value of the deformation parameter,
    calculating, as a function of the second signal received from the second sensor, a temperature value of the mold.

3. The monitoring apparatus according to claim 1, wherein the deformation parameter comprises at least one of:
    a deformation of the mold,
    a displacement of the mold,
    a speed of the mold,
    an acceleration of the mold.

4. The monitoring apparatus according to claim 1, wherein the threshold parameter comprises at least one of:
    a limit deformation of the mold,
    a limit displacement of the mold,
    a limit displacement speed of the mold,
    a limit acceleration of the mold.

5. The monitoring apparatus according to claim 1, wherein the threshold parameter comprises:
    a variable value defined as a function of the temperature of the mold, or
    at least one value defined at the predetermined reference temperature.

6. The monitoring apparatus according to claim 1, wherein the deformation parameter normalized at the reference temperature comprises at least one of:
    a deformation of the mold standardized at the reference temperature,
    a displacement of the mold standardized at the reference temperature,
    a speed of the mold standardized at the reference temperature,
    an acceleration of the mold standardized at the reference temperature.

7. The monitoring apparatus according to claim 1 comprising:
    at least one first sensor associable with the mold and configured for emitting the first signal representative of the deformation parameter of said mold,
    at least one second sensor also associable with the mold and configured for emitting the second signal representative of a temperature of said mold.

8. The monitoring apparatus according to claim 7, wherein the first sensor comprises at least one of:
    a strain gauge carried directly by a portion of the mold, and
    a proximity sensor carried by an external structure that is distinct from the mold.

9. The monitoring apparatus according to claim 7, wherein the second sensor comprises at least one of: a thermocouple, an electric heating thermometer, an infrared thermometer, a fiber optic sensor, a strain gauge.

10. The monitoring apparatus according to claim 7, wherein said control procedure further comprises the steps of:
    receiving, from the second sensor, the second signal representative of a temperature value of the mold,
    estimating, by means of the second signal, a temperature of the mold,
    determining, at least as a function of the temperature of the mold, a compensation coefficient,
    calculating, as a function of the first signal of the first sensor and of the compensation coefficient, the value of the deformation parameter of the mold.

11. The monitoring apparatus according to claim 7, wherein the step of calculating the value of the deformation parameter of the mold comprises a sub-step of multiplying the first signal of the first sensor or an estimate of the value of the deformation parameter by the compensation coefficient in order to calculate the value of the deformation parameter of the mold.

12. The monitoring apparatus according to claim 7, wherein the first and the second sensor are distinct from each other.

13. The monitoring apparatus according to claim 1, wherein the threshold parameter is a function of an elasticity parameter representative of a mechanical characteristic of the mold.

14. The monitoring apparatus according to claim 13, wherein the elasticity parameter comprises at least one of:
   an elastic modulus of at least one material in which the mold is made, and
   a geometry of the mold.

15. The monitoring apparatus according to claim 1, wherein said control procedure further comprises the following steps:
   sending an alarm message to at least one user;
   recording in a memory at least one of:
   the signal or values representative of the deformation parameter,
   the signal or values representative of the temperature of the mold.

16. The monitoring apparatus according to claim 1, wherein the control unit is connectable to a pressure sensor configured for emitting a signal representative of a pressure inside the mold,
   said control procedure also comprises the following steps:
      receiving, as the input, said signal representative of the pressure,
      calculating, as a function of said signal representative of a pressure inside the mold, at least one pressure value,
   wherein the control procedure comprises a step of receiving at least one value representative of a pressure inside the mold from said pressure sensor,
   said control procedure also comprises a step of defining the threshold parameter as a function of the value representative of the pressure inside the mold.

17. The monitoring apparatus according to claim 1, wherein the control unit is connectable to a safety sensor configured for emitting a signal representative of an open or closed condition of the mold,
   said control procedure also comprising the following steps:
      receiving the signal representative of an open or closed condition of the mold from the safety sensor,
      determining, as a function of said signal representative of an open or closed condition of the mold, an open or closed condition of the mold.

18. The monitoring apparatus according to claim 1 wherein the control unit is connectable to a pressure sensor configured for emitting a signal representative of a pressure inside the mold,
   said control procedure also comprises the following steps:
      receiving, at the input, said signal representative of the pressure, and
      calculating, as a function of said signal representative of a pressure inside the mold, at least one pressure value,
   wherein the control procedure comprises a step of receiving at least one value representative of a pressure inside the mold from said pressure sensor,
   said control procedure also comprises a step of defining the threshold parameter as a function of the value representative of the pressure inside the mold;
   wherein the control unit is connectable to a safety sensor configured for emitting a signal representative of an open or closed condition of the mold,
   said control procedure also comprising the following steps:
      receiving the signal representative of an open or closed condition of the mold from the safety sensor, and
      determining, as a function of said signal representative of an open or closed condition of the mold, an open or closed condition of the mold,
   the monitoring apparatus further comprising at least one memory connected to the control unit, said memory being configured for storing at least one of:
      the signal or values of the threshold parameter,
      the signal or values of the deformation parameter,
      the signal or values representative of the temperature of the mold,
      the signal or values of the normalized threshold parameter,
      the signal or values of the normalized deformation parameter,
      the value of the reference temperature,
      a signal or values of pressure inside the mold, and
      a signal representative of the open or closed condition of the mold.

19. Monitoring apparatus for molds, said monitoring apparatus comprising a control unit connectable to:
   a first sensor associable with the mold and configured for emitting a first signal representative of a deformation parameter of said mold,
   a second sensor also associable with the mold and configured for emitting a second signal representative of a temperature of said mold,
   said control unit being configured for executing a control procedure comprising the following steps:
      receiving the first signal from the first sensor representative of a value of the deformation parameter,
      receiving the second signal from the second sensor representative of a temperature value of the mold,
      determining at least one alert condition,
   wherein the determination of the alert condition comprises:
      defining a value of a threshold parameter as a function of the temperature of the mold and comparing the value of the deformation parameter determined at the temperature of the mold with the value of the threshold parameter defined as a function of the temperature of the mold, or
      normalizing, at a reference temperature, the value of the deformation parameter determined at the temperature of the mold and comparing such value with a value of a threshold parameter defined at the reference temperature,
   wherein the deformation parameter normalized at the reference temperature comprises at least one between:
      a deformation of the mold standardized at the reference temperature,
      a displacement of the mold standardized at the reference temperature,
      a speed of the mold standardized at the reference temperature,
      an acceleration of the mold standardized at the reference temperature.

20. Monitoring apparatus for molds, said monitoring apparatus comprising a control unit connectable to:
   a first sensor associable with the mold and configured for emitting a first signal representative of a deformation parameter of said mold, a second sensor also associable with the mold and configured for emitting a second signal representative of a temperature of said mold, said control unit being configured for executing a control procedure comprising the following steps:
  receiving the first signal from the first sensor representative of a value of the deformation parameter,
  receiving the second signal from the second sensor representative of a temperature value of the mold,
  determining at least one alert condition, wherein the determination of the alert condition comprises:
  defining a value of a threshold parameter as a function of the temperature of the mold and comparing the value of the deformation parameter determined at the temperature of the mold with the value of the threshold parameter defined as a function of the temperature of the mold, or
  normalizing, at a reference temperature, the value of the deformation parameter determined at the temperature of the mold and comparing such value with a value of a threshold parameter defined at the reference temperature, wherein the monitoring apparatus further comprises:
  at least one first sensor associable with the mold and configured for emitting the first signal representative of the deformation parameter of said mold,
  at least one second sensor also associable with the mold and configured for emitting the second signal representative of a temperature of said mold,
  wherein the step of calculating the value of the deformation parameter of the mold comprises a sub-step of multiplying the first signal of the first sensor or an estimate of the value of the deformation parameter by the compensation coefficient in order to calculate the value of the deformation parameter of the mold.

* * * * *